Figure 5:
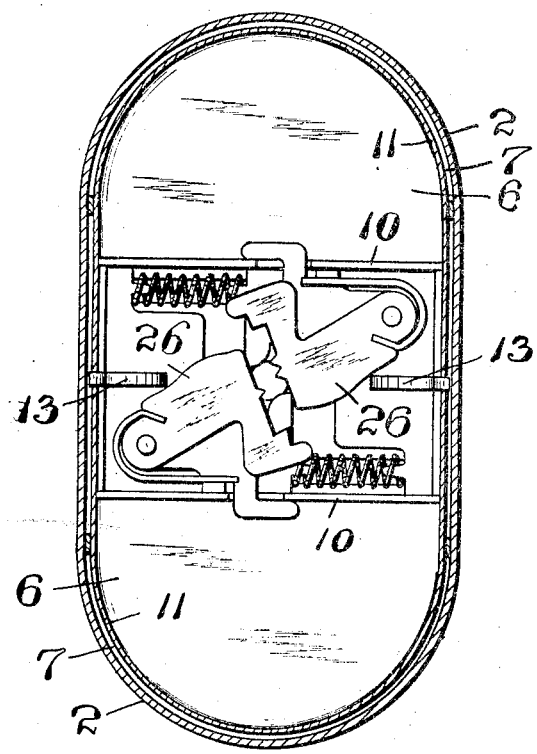

B. VOM EIGEN.
SAVINGS BANK.
APPLICATION FILED FEB. 24, 1912.
1,057,130.
Patented Mar. 25, 1913.
2 SHEETS—SHEET 1.
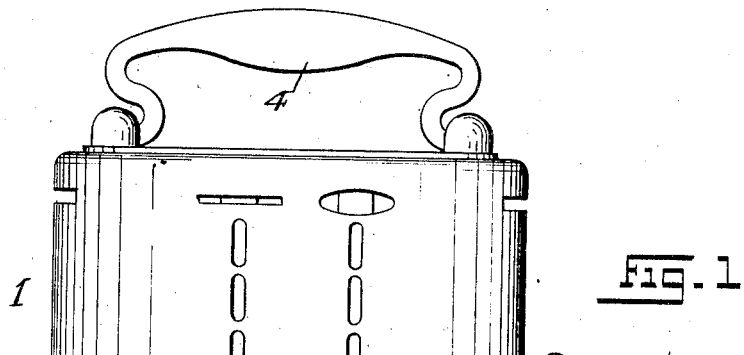
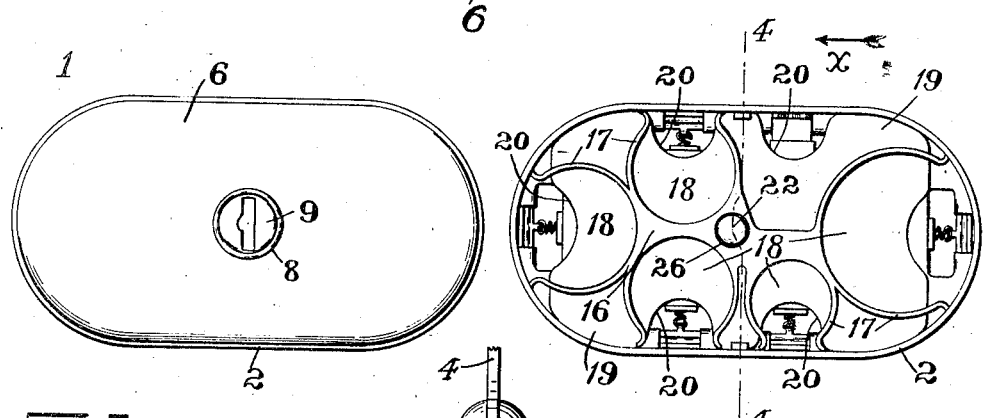
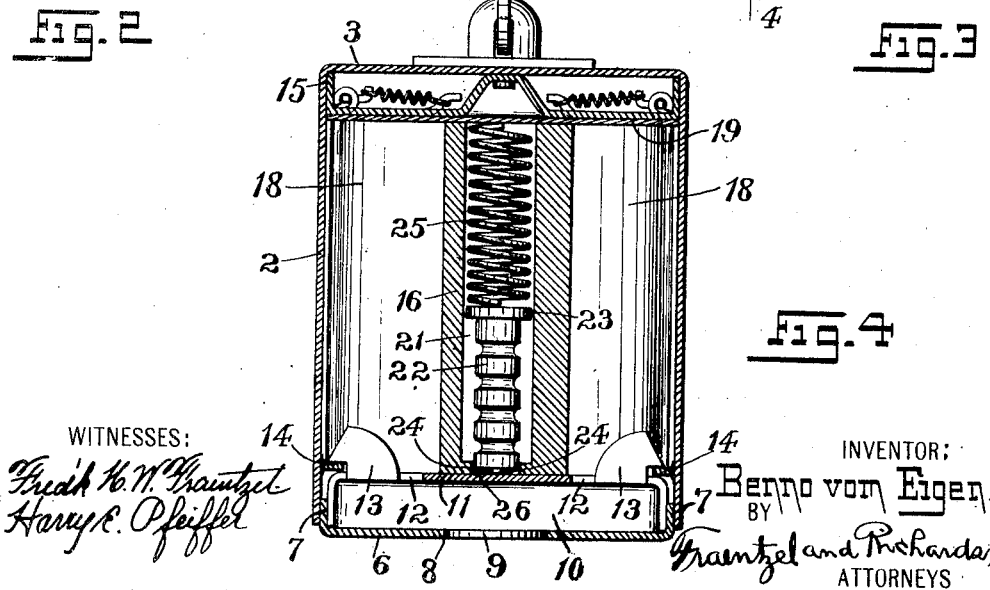
WITNESSES:
Fred'k H. W. Fraentzel
Harry E. Pfeiffer
INVENTOR:
Benno vom Eigen
BY Fraentzel and Richards,
ATTORNEYS

B. VOM EIGEN.
SAVINGS BANK.
APPLICATION FILED FEB. 24, 1912.

1,057,130.

Patented Mar. 25, 1913.
2 SHEETS—SHEET 2.

WITNESSES:
Harry E. Pfeiffer
Fred H. W. Fraentzel

INVENTOR:
Benno vom Eigen
BY
Fraentzel and Richards,
ATTORNEYS

UNITED STATES PATENT OFFICE.

BENNO VOM EIGEN, OF NEWARK, NEW JERSEY, ASSIGNOR TO AUG. GOERTZ & CO., A CORPORATION OF NEW JERSEY.

SAVINGS-BANK.

1,057,130.  Specification of Letters Patent.  Patented Mar. 25, 1913.

Original application filed November 23, 1911, Serial No. 661,911. Divided and this application filed February 24, 1912. Serial No. 679,611.

*To all whom it may concern:*

Be it known that I, BENNO VOM EIGEN, citizen of the United States, residing at Newark, in the county of Essex and State of New Jersey, have invented certain new and useful Improvements in Savings-Banks; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

This invention relates, generally, to improvements in portable savings banks, and is in the nature of a division of my former application for Letters-Patent, filed November 23, 1911, Serial Number 661,911.

The present invention has for its principal object to provide a novel and simply constructed savings-bank of the general character set forth in my said former application for Letters-Patent, comprising within a suitable casing or shell, a removable coin-tray provided with a carrying element slidably disposed within a receiving portion forming a part of said tray, but the said carrying element presenting itself automatically to the person, when the casing or shell is opened, for readily grasping said carrying element and to remove the coin-tray from said casing or shell and to readily carry the coin-tray about.

The invention has for its further object to provide a portable savings-bank with a removable coin-tray and an automatically operating carrying element, as hereinabove stated, the casing or shell of the bank being provided with an open end or bottom which is adapted to be closed by means of a lock-provided and key-operated plate, coöperating with the said carrying element of the coin-tray for forcing it into its inoperative position within a receiving portion with which the coin-tray is provided, when the said coin-tray has been arranged in the casing or shell of the bank, and when the lock-provided plate has been brought into its closing relation with the open end or bottom of the said casing or shell.

Other objects of this invention not at this time more particularly enumerated will be clearly understood from the following detailed description of the present invention.

With the various objects of the present invention in view, the said invention consists, primarily, in the novel arrangements and combinations of the various devices and parts, as well as in the details of the construction of the same, all of which will be more fully described in the following specification, and then finally embodied in the clauses of the claim which are appended to and which form an essential part of the said specification.

The invention is clearly illustrated in the accompanying drawings, in which:—

Figure 6:
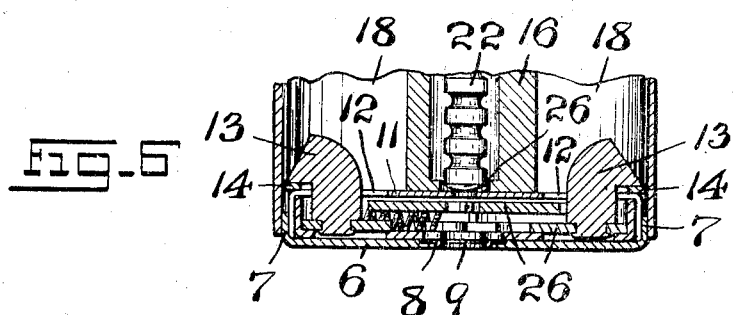

Figure 1 is a side elevation; and Fig. 2 a bottom view of a portable savings bank made according to and embodying the principles of the present invention. Fig. 3 is also a bottom view of the bank, with the lock-provided closing plate removed, and showing in end-elevation one arrangement of removable coin-tray within the casing or shell of the bank. Fig. 4 is a transverse vertical section of the several devices or parts in their assembled relations, said section being represented as taken on line 4—4 in said Fig. 3, looking in the direction of the arrow $x$, and said view being made on an enlarged scale. Fig. 5 is a horizontal sectional representation of the lower portion of the shell or casing of the savings bank, and of the removable closing device arranged in the lower open portion of said shell or casing, said view showing in connection therewith, and in plan, one arrangement of a key-operated locking mechanism, for locking the said closing device within said open portion of the shell or casing; and Fig. 6 is a transverse vertical section of the said parts represented in said Fig. 5, said view illustrating in connection therewith portions of a coin-receiving tray and a carrying stem connected therewith.

Similar characters of reference are employed in all of the above described views, to indicate corresponding parts.

Referring now to the several figures of the drawings, the reference-character 1 indicates one form of complete portable savings-bank made according to and embodying the principles of the present invention, the same comprising a suitably formed shell or casing 2 which is open at the bottom, but is provided with a closed end or top, as 3, to which is suitably secured a handle, as 4. Suitably disposed in the upper end-portions of the side-walls of the said shell or casing 2 are a number of coin-receiving slots for the insertion and the depositing of coins of the various denominations, and of bills or paper-money, in the various receiving members of a coin-tray which is removably arranged within the said shell or casing 2, and can be removed from said shell or casing through its open end, in the manner to be presently more fully set forth. The said open end of the said shell or casing 2 may be closed by means of a removable closing device which is suitably fitted in the said open end, as clearly shown in Fig. 4 of the drawings. This closing device consists, essentially, of a bottom-plate 6 which is surrounded by a marginal and upwardly extending flange 7 of the same conformation as the inner contour of the said shell or casing 2, said plate 6 being provided with an opening, as 8, in which is fitted the key-receiving barrel 9 of a suitably formed lock-mechanism 26 contained in a box or case 10. Suitably connected with the said bottom-plate 6 and held in place by means of the flange 7, or fastened thereto in any other suitable manner, is an inverted flanged plate or shell 11, said plates 6 and 11 providing a suitable receptacle in which the box or case 10 which contains the lock-mechanism is arranged, said flanged plate or shell 11 being provided with slots or elongated openings 12 through which extend suitably formed holding or retaining catches 13 with which the lock-mechanism is provided, and which are adapted to be operated by the tumblers of the lock-mechanism to cause the same to engage a pair of retaining lugs 14 which are secured upon the inner sides of the shell or casing 2, and from which the said catches 13 can be disengaged when the lock-mechanism is operated by means of a key. Suitably arranged within the upper end-portion of the said shell or casing 2 is a carrier-plate 15, which is suitably secured in its fixed position within said shell or casing; said carrier-plate having operatively mounted thereon, in the manner to be more fully described in another application filed by myself contemporaneously herewith, suitably formed coin-actuated slot-closing devices. Arranged within the said shell or casing 2 is a removably disposed coin-receiving tray within which the coins and bills which have been passed through the several slots arrange themselves. The said coin-receiving tray comprises a suitable casting 16 which is formed with suitably shaped vertical flanges 17, adapted to provide cylindrical compartments, as 18, in communication with the respective receiving or depositing slots in the said shell or casing 2, and which respectively conform in cross-section to the shapes and sizes of coins of the various denominations which are adapted to be passed through the several coin-receiving or depositing slots, as will be clearly understood. Suitably connected with the said coin-tray is a supporting plate 19, which may be secured to the said casing 16 in any suitable manner, said supporting plate 19 being provided with openings or cut-way portions 20, see Fig. 3 of the drawings, located, when the said coin-tray is within the shell or casing 2, at the tops of the cylindrical compartments 18, but when the coin-tray is withdrawn from the said shell or casing and is carried about, the said openings or cut-away portions 20 being located beneath the said compartments, so that, when the coins are supported upon said supporting plate, a portion of the bottom of each column of coins is exposed to contact with the fingers, and thus may be lifted out of the compartment. The said coin-tray, thus formed, is inserted within the shell or casing 2 through the open bottom, in such a manner, that the supporting plate 19 thereof is arranged beneath the previously-mentioned carrier-plate 15; that is, the said supporting plate is at the top of the said shell or casing 2, and the lower open portions of the coin-receiving compartments are closed by the inverted plate or shell 11 of the removable and lock-mechanism containing closing device when the same has been operatively disposed in its closing relation within the open bottom-portion of the said shell or casing 2, as will be clearly evident from an inspection of Fig. 4 of the drawings.

With portable savings banks of this character, as the coins are deposited through the coin-receiving or depositing slots, they pile themselves up within the respective compartments, with the coins resting upon the said previously-mentioned inverted plate or shell 11. When it is desired, however, to remove the coins from the bank, the latter is turned upside down, and a key is applied to the locking mechanism contained within the box 10 which is located between the plates 6 and 11, to withdraw the holding or retaining catches 13 from their locked engagement with the retaining or holding lugs 14, so that the closing device, formed by the said plates 6 and 11, and the locking mechanism thereof, can be readily removed from their closing relation within the lower open portion of the said shell or casing 2, as will be readily understood. As soon as the bank has thus been turned into this upside down position, the relative positions of the coins in the several columns of coins within the compartments of the coin-tray are also reversed, so that each column of coins in such position will rest directly upon the said supporting plate 19. After the above-mentioned closing device has been removed, the coin-tray may be lifted out of the shell or casing 2, carrying with it the various columns of coins which are supported upon said plate 19, and the coins can then be easily removed from their respective compartments by the operator, as will be clearly evident. To more easily effect the removal and withdrawal of the coin-tray from within the said shell or casing 2, the casting of the coin-tray is provided with a socket-like or tubular part, as 21, in which is slidably disposed a suitably formed stem or rod 22, which as will presently appear serves as a lifting and carrying element or handle. This stem may be provided upon its inner end-portion, within the said socket-like or tubular part 21, with a head or flange 23 which, when the said stem or rod 22 is extended into its operative lifting or carrying position, engages an annular flange or projection 24 at the mouth of said socket-like or tubular part 21, whereby the outward movement of the said stem or rod 22 is limited. A coiled spring 25 is arranged within the said socket-like or tubular part 21, and between the said supporting plate 19 which closes the one end of the said part 21, and the said head 23 at the inner end-portion of the stem or rod 22, said spring 25 serving to project or force a portion of the said stem or rod beyond the face of the casting 16, as soon as the closing device has been removed from within the open end-portion of the shell or casing 2, so as to permit the operator to easily take hold of the said projecting portion of the stem or rod 22 for the withdrawal of the coin-tray from within the shell or casing 2, and also to serve as a means whereby the operator is allowed to readily carry the coin-tray about. When the closing device is again placed in its closed relation within the open end of the said shell or casing 2, the inverted plate or shell 11 of the said closing device is brought directly against the end of the projected portion of the said stem or rod 22, so that the said stem or rod is thereby forced and returned into the said socket-like or tubular part 21, against the tension of the compressed spring, in which position the said stem or rod is held, until the closing device is again removed from the said shell or casing 2 in the manner hereinabove mentioned. That the said stem or rod 22 may not be entirely withdrawn from within the said socket-like or tubular portion 21 of the casting 16, when carrying the coin-tray about, or that the said stem or rod may not be entirely forced out of the said socket-like or tubular portion 21 by the action of the spring, the head or flange 23 engages with the said inwardly extending annular flange 24, the opening 26 formed by said flange 24 being of a slightly larger cross-area than that of the stem or rod 22, the cross-area of the socket-like or tubular portion 21 being slightly larger than the cross-area of the head of said stem or rod, and all being arranged and constructed so as to provide a free and easy movement of the parts, all of which will be clearly evident from an inspection of Fig. 4 of the drawings.

I am fully aware that some changes may be made in the general arrangements and combinations of the several devices and parts, as well as in the details of the construction of the said parts, without departing from the scope of the present invention, as set forth in the foregoing specification and as defined in the clauses of the claims which are appended to the said specification. Hence, I do not limit my present invention to the exact arrangements and combinations of the said devices and parts as described in the said specification, nor do I confine myself to the exact details of the construction of the said parts as illustrated in the accompanying drawings.

I claim:—

1. A coin-receiving bank comprising an outer-shell, a member removably connected with said shell, a coin-tray removably arranged within said shell, said coin-tray being provided with a tubular portion, and a spring-actuated carrying element movably arranged within said tubular portion of the coin-tray.

2. A coin-receiving bank comprising an outer shell, a coin-tray removably arranged within said shell, said coin-tray being provided with a tubular portion, a carrying-element slidably arranged within said tubular portion, and means within said tubular portion for automatically forcing a part of said carrying-element from said tubular portion.

3. A coin-receiving bank comprising an outer shell, a coin-tray removably arranged within said shell, said coin-tray being provided with a tubular portion, a carrying-element slidably arranged within said tubular portion, means within said tubular portion for automatically forcing a part of said carrying-element from said tubular portion, and means connected with said shell for forcing the entire carrying-member into said tubular portion of the coin-tray.

4. A coin-receiving bank comprising an outer shell, a coin-tray removably arranged within said shell, said coin-tray being provided with a tubular portion, a carrying-element slidably arranged within said tubular portion, and a spring within said tubular portion for automatically forcing a part of said carrying-element from said tubular portion.

5. A coin-receiving bank comprising an outer shell, a coin-tray removably arranged within said shell, said coin-tray being provided with a tubular portion, a carrying-element slidably arranged within said tubular portion, a spring within said tubular portion for automatically forcing a part of said carrying-element from said tubular portion, said shell of the bank being provided with an open bottom, and a bottom-plate removably arranged in the said open bottom of the shell, said bottom-plate when in operation forcing the entire carrying-member into said tubular portion of the coin-tray.

6. In a device of the kind described, an outer shell, a coin-tray removably arranged therein, a removable bottom-plate connected with said shell, and a collapsible handle-member connected with said coin-tray comprising a handle-portion slidably arranged within a tubular portion with which said coin-tray is provided, a head at the inner end of said handle-portion, a spring within said tubular portion for projecting said handle-portion outwardly from said tubular portion when the bottom-plate is removed from said outer shell, and an annular flange arranged in the mouth of said tubular portion of said coin-tray for limiting the outward projection of said handle-portion, substantially as and for the purposes set forth.

7. In a portable savings bank, an outer shell provided with coin-receiving openings and a lower open bottom-portion, a coin-tray removably arranged within said shell, said coin-tray being provided with coin-receiving compartments, a closing device removably arranged in said lower open bottom portion of said shell, said closing device being in engagement with said coin-tray for retaining it in its coin-receiving relation within said shell, said closing device comprising a pair of connected flanged plates forming a receptacle, a locking mechanism within said receptacle, one of said plates being provided with slots, and the other plate being provided with an opening for the reception of a portion of the key-receiving barrel of the locking-mechanism, and retaining catches connected with said locking mechanism, said catches extending through said slots and being adapted to be brought into separable holding engagement with said shell.

In testimony, that I claim the invention set forth above I have hereunto set my hand this 21st day of February, 1912.

BENNO vom EIGEN.

Witnesses:
FREDK. C. FRAENTZEL,
FREDK. H. W. FRAENTZEL.